May 1, 1962  SHIH-WOO LOU  3,032,224
THERMOS JUG
Filed Feb. 5, 1960  2 Sheets-Sheet 1
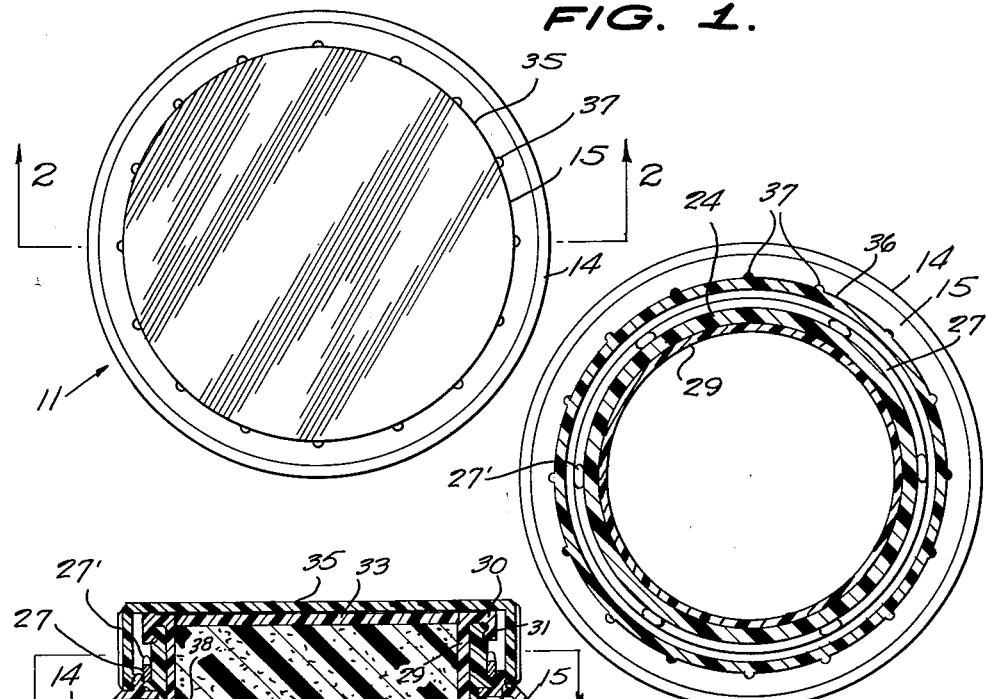
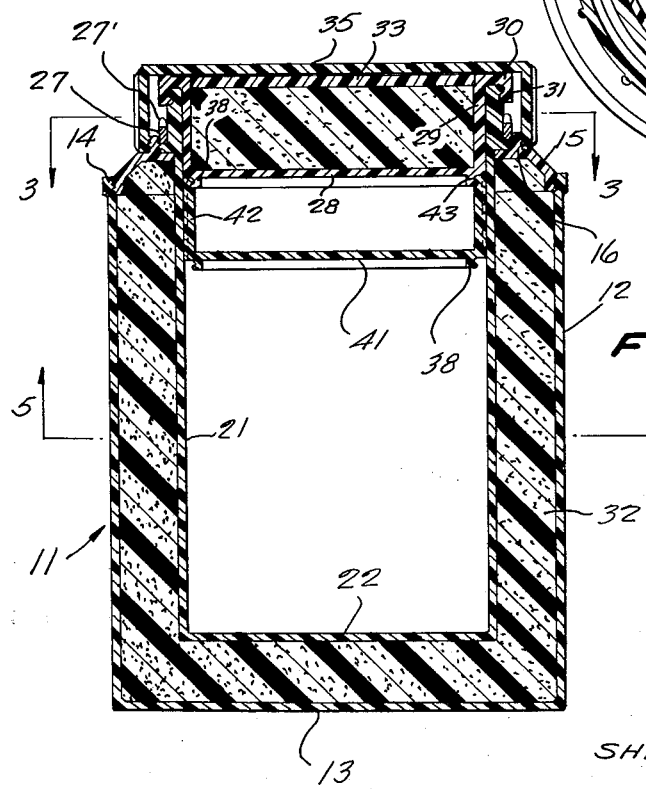
INVENTOR.
SHIH-WOO LOU,
BY
McMorrow, Berman & Davidson
ATTORNEYS.

May 1, 1962  SHIH-WOO LOU  3,032,224
THERMOS JUG
Filed Feb. 5, 1960　　　　　　　　　　　　　2 Sheets-Sheet 2
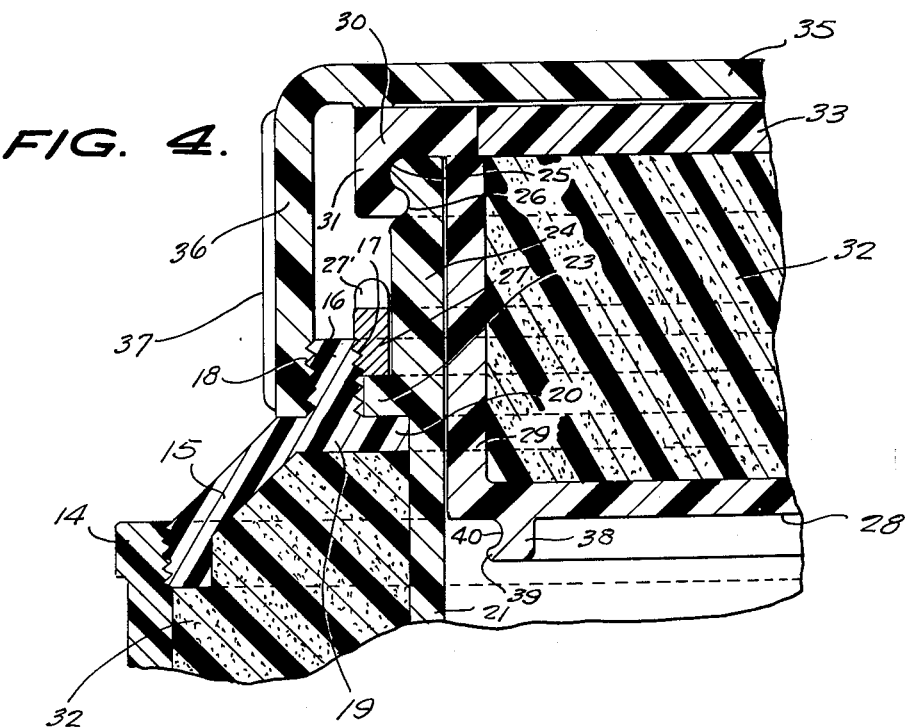
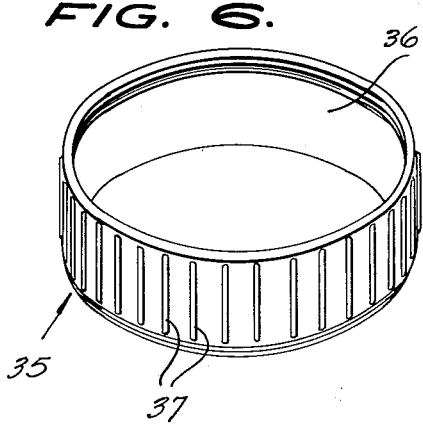
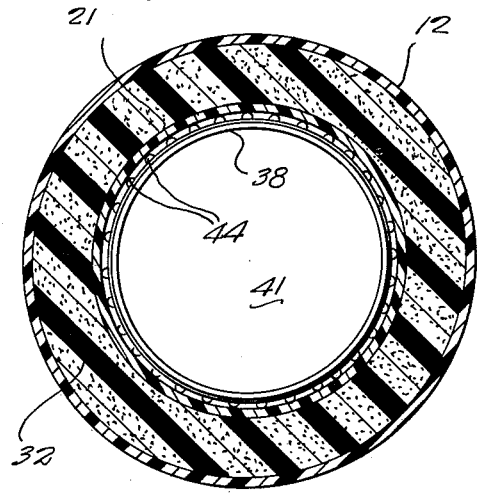
INVENTOR.
SHIH-WOO LOU,
BY
McMorrow, Berman & Davidson
ATTORNEYS.

3,032,224
THERMOS JUG
Shih-Woo Lou, 395 Queen's Road E., 4th Floor,
P.O. Box 1076, Victoria, Hong Kong
Filed Feb. 5, 1960, Ser. No. 6,926
4 Claims. (Cl. 215—13)

This invention relates to heat-insulated food containers, and more particularly to a thermos jug.

A main object of the invention is to provide a novel and improved thermally insulated food or liquid container, the container being relatively simple in construction, being substantially unbreakable, and being leak-proof.

A further object of the invention is to provide an improved thermos jug which is relatively inexpensive to manufacture, which is durable in construction, which is relatively light in weight, which is easy to assemble, and which has excellent heat-insulating properties.

Further objects and advantages of the invention will become apparent from the following description and claims, and from the accompanying drawings, wherein:

FIGURE 1 is a top plan view of an improved thermos jug constructed in accordance with the present invention.

FIGURE 2 is a vertical cross sectional view taken substantially on the line 2—2 of FIGURE 1.

FIGURE 3 is a horizontal cross sectional view taken substantially on the line 3—3 of FIGURE 2.

FIGURE 4 is an enlarged fragmentary vertical cross sectional view taken through a top portion of the jug of FIGURE 1.

FIGURE 5 is a horizontal sectional view taken substantially on line 5—5 of FIGURE 2.

FIGURE 6 is a bottom perspective view of the closure cap of the thermos jug of FIGURES 1 to 5.

Referring to the drawings, 11 generally designates an improved thermos jug constructed in accordance with the present invention. The jug 11 comprises an outer shell member 12 which may be of any suitable shape, for example, substantially cylindrical, and which is provided with a circular bottom wall 13. The shell member 12 is formed at its top end with the rim 14 provided with internal threads. Designated at 15 is an annular shoulder member which is threadedly engaged with the internal threads of the rim 14 and which is formed with an upstanding annular flange 16 having both internal and external threads, shown respectively at 17 and 18 in FIGURE 4.

The upstanding annular flange 16 is formed on the intermediate portion of the horizontal top element 19 of the shoulder member 15, defining an inwardly projecting annular horizontal lip 20. Designated at 21 is an inner shell member which is generally cylindrical in shape and which is provided with a circular bottom wall 22. The shell member 21 is dimensioned to slidably fit inside the horizontal top element 19 of the shoulder member 19 and is formed at its upper portion with the outwardly projecting annular flange 23 which is supportingly engageable on the inwardly projecting annular lip member 20, as is clearly shown in FIGURE 4. The inner shell member 21 is formed above the flange 23 with the thickened rim portion 24 which is of substantial height and which is formed at its top edge with the rounded lip 25 and with the rounded outwardly facing annular groove 26 located immediately below the lip 25, as is clearly shown in FIGURE 4.

A clamping ring 27 is engaged over the rim portion 24 of the inner shell member 21 and is provided with external threads engageable with the internal threads 17 of the upstanding annular flange element 16, as is clearly shown in FIGURE 4, whereby the ring member 27 exerts clamping force on the flange 23 when tightened, to rigidly secure the inner shell member 21 to the annular shoulder member 15. Spaced upstanding lugs 27' are provided on the top surface of ring 27 to facilitate the tightening or loosening of said ring.

Designated generally at 28 is a closure plug which comprises a shell member 29 dimensioned to slidably engage inside the top portion 24 of the inner shell 21, the shell member 29 being formed with the outwardly projecting top flange 30 having depending flexible peripheral lip portion 31 formed to lockingly interengage with the rounded bead 25 and the subjacent rounded groove 26 of the rim portion 24. Although the flange 30 and the depending lip 31 are integral with the shell member 29, the material employed for the shell member is of sufficient flexibility so that the flange 30 and the depending peripheral locking element 31 are relatively flexible as compared to the remainder of the shell. Thus, the shell member 29 may be formed of relatively flexible plastic material such as polyethylene, or similar material. The same material may be employed for the other parts of the thermos jug, such as the inner shell 21, the shoulder member 15, and the outer shell 12.

The casing 29 of the closure plug defines a container which may be employed to house a rigid cylindrical body of heat-insulating material, such as foamed polystyrene or polyurethane, shown at 32 in FIGURE 4. A collar disc 33 is rigidly secured in the top of the housing 29, being cemented therein by the use of suitable adhesive. Thus, the cover disc 33 defines a top wall which is flush with the top surface of the outwardly extending horizontal annular flange 30, as shown in FIGURE 4.

Designated at 35 is a closure cap which is provided with the depending cylindrical wall 36 having internal threads engageable with the external threads 18 of the upstanding annular flange 16, as shown in FIGURE 4, the cap member 35 being clampingly engageable on the outwardly extending peripheral flange portion 30 of the closure plug 28, as shown in FIGURE 4, to lock the closure plug in its sealing position. The cover cap 35 is provided on its cylindrical wall 36 with a plurality of vertical ribs 37 to facilitate grasping the closure cap when it is to be removed or tightened.

As shown in FIGURES 2 and 4, the space between the outer shell 12 and the inner shell 21 is preferably filled with heat-insulating material similar to the material 32, namely, foamed polystyrene or polyurethane, preferably in the form of a rigid unitary body.

The bottom wall of the closure plug 28 is integrally formed with a depending annular rib 38 which is provided with the rounded bottom lip 39 and the rounded outwardly facing groove 40 immediately above said bottom lip, the rib 38 being located near the periphery of the bottom wall of closure plug 28, as shown in FIGURE 4. Designated at 41 is an auxiliary container having the cylindrical wall 42 which is formed at its top rim with a flexible bead 43 adapted to lockingly engage in the groove 40 and which is formed below said bead with a groove shaped to interfit with the rounded bead 39 of the depending annular member 38, whereby the auxiliary container 41 may be lockingly engaged with the depending annular member 38 in the manner illustrated in FIGURE 2. The auxiliary container 41 may be employed to receive additional food articles or to house a quantity of ice cubes or similar refrigerating material. The auxiliary container 41 is formed at its bottom wall with a depending suspension rib 38 identical to that provided on the bottom wall of closure plug 28, so that additional auxiliary containers may be suspended inside the inner shell 21 in the same manner as described above.

As above mentioned, the various components of the assembly are preferably formed of durable plastic material such as polyethylene, polystyrene, or the like, so that it is substantially unbreakable. As is well known, these materials are resistant to high temperatures and are chemically resistant to food materials so that such materials may be carried in the container without any risk of contamination of the food articles. Also, the inner shell member 21 may be easily taken out and cleaned by washing it in hot or boiling water and by the use of common cleaning materials.

As will be readily apparent, the device may be employed to carry liquids as well as solid food articles, and may be dimensioned so that it may be employed as a drinking cup when the cover cap 35 and the closure plug 28 are removed.

As above mentioned, the auxiliary container 41 may be employed to carry food materials such as desserts, or the like, to isolate such food materials from the remaining contents of the jug. It may also be employed as a container for ice, which may be employed to refrigerate the jug.

As shown in FIGURES 2 and 5, the inner container or auxiliary container 41 is provided with vertical, spaced ribs 44 on the outer surface of its cylindrical wall, said ribs 44 acting as spacing means to provide a certain amount of clearance for air circulation between the auxiliary container 41 and the inside surface of the inner shell 21. As will be readily apparent, when the auxiliary container 41 is used to contain refrigeration material, such as ice or the like, this increases the exposed surface area of the auxiliary container 41 with respect to the interior of the inner shell 21, and thus promotes better refrigeration. The ribs 44 therefore not only provide more uniformity of temperature inside the inner shell 21, but also facilitate the removal of the auxiliary container 41 from the top portion of the inner shell 21 when the closure plug 28 is lifted off the inner shell.

From the above description it will be seen that the thermos jug is readily and easily taken apart for cleaning, and may be manufactured of substantially unbreakable material. It also may be employed to carry two or more different types of food articles, as above explained, or can be employed to carry a quantity of ice or similar refrigerating material in the auxiliary container 41. Preferably, all of the components of the assembly are made of plastic material, such as above described, which makes it suitable for mass production methods and which makes it possible to manufacture said components at a relatively low cost.

By using substantially the same material for the outer shell member 12 and the shoulder member 15 as the inner shell member 21, the shoulder member 15 may be permanently secured between the outer shell member and the inner shell member by suitable adhesive, eliminating the necessity for using a clamping ring 27, and allowing the jug to be cleaned by washing it as a unit in hot or boiling water. This not only reduces manufacturing cost but eliminates the necessity of taking the jug apart for cleaning.

While a specific embodiment of an improved thermos jug has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a thermos jug, an outer shell member, an annular shoulder member threadedly engaged in the top portion of said outer shell member, an inner shell member engaged on and supported by said shoulder member within said outer shell member in spaced relation thereto, said inner shell member having an annular top rim extending above said shoulder member, an outwardly-projecting annular flange on said shell member below said top rim and engaged on said shoulder member, a clamping ring engaged over said rim portion and supported on said flange and threadedly engaged on said shoulder member, a closure plug member slidably received in said top rim, and a flexible depending peripheral annular lip element on said plug member lockingly engageable with said top rim.

2. In a thermos jug, an outer shell member, an annular shoulder member threadedly engaged in the top portion of said outer shell member, an inner shell member secured on and supported by said shoulder within said outer shell member in spaced relation thereto, said inner shell member having an annular top rim extending above said shoulder member, an outwardly-projecting annular flange on said shell member below said top rim and engaged on said shoulder member, a clamping ring engaged over said rim portion and supported on said flange and threadedly engaged on said shoulder member, a closure plug member slidably received in said top rim, said top rim being formed with an outwardly facing annular locking groove, and a flexible depending inwardly directed peripheral annular lip element on said plug member lockingly engageable in said locking groove.

3. In a thermos jug, an outer shell member, an annular shoulder member threadedly engaged in the top portion of said outer shell member, an inner shell member secured on and supported by said shoulder member within said outer shell member in spaced relation thereto, said inner shell member having an annular top rim extending above said shoulder member, a closure plug member slidably received in said top rim, said top rim being formed with an outwardly facing annular locking groove, a flexible depending inwardly directed peripheral annular lip element on said plug member lockingly engageable in said locking groove, and a cap member threadedly engageable with said shoulder member and being clampingly engageable with the top surface of said plug member.

4. In a thermos jug, an outer shell member, an annular shoulder member threadedly engaged in the top portion of said outer shell member, an inner shell member secured on and supported by said shoulder member within said outer shell member in spaced relation thereto, said inner shell member having an annular top rim extending above said shoulder member, a closure plug member slidably received in said top rim, said top rim being formed wtih an outwardly facing annular locking groove, a flexible depending inwardly directed peripheral annular lip element on said plug member lockingly engageable in said locking groove, a depending annular outwardly projecting rib on the peripheral portion of the bottom surface of said closure plug member, and an auxiliary container having a flexible annular top rim portion lockingly engageable on said depending annular rib and being receivable in said inner shell member below said closure plug member.

References Cited in the file of this patent
UNITED STATES PATENTS

| | | |
|---|---|---|
| 2,575,283 | Menrath | Nov. 13, 1951 |
| 2,633,264 | Dinsmore et al. | Mar. 31, 1953 |
| 2,830,722 | Darmstadt | Apr. 15, 1958 |

UNITED STATES PATENT OFFICE
CERTIFICATE OF CORRECTION

Patent No. 3,032,224            May 1, 1962

Shih-Woo Lou

It is hereby certified that error appears in the above numbered patent requiring correction and that the said Letters Patent should read as corrected below.

In the heading to the drawings, Sheets 1 and 2, line 2 thereof, and in the heading to the printed specification, line 2, title of invention, for "THERMOS JUG", each occurrence, read -- HEAT-INSULATED CONTAINER --; column 1, line 9, strike out ", and more particularly to a thermos jug"; lines 15, 22 and 23, 34 and 36, column 2, line 19, column 3, lines 38, 59 and 60, and 67, and column 4, lines 13, 29, and 44, for "thermos jug", each occurrence, read -- heat-insulated container --.

Signed and sealed this 16th day of April 1963.

(SEAL)
Attest:

ERNEST W. SWIDER
Attesting Officer

DAVID L. LADD
Commissioner of Patents